US007810044B2

(12) United States Patent
de Brebisson et al.

(10) Patent No.: US 7,810,044 B2
(45) Date of Patent: Oct. 5, 2010

(54) ELECTRONIC DEVICE DISPLAY ADJUSTMENT INTERFACE

(75) Inventors: Cyrille de Brebisson, Boise, ID (US);
Gregory Thorn Springer, La Jolla, CA (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 627 days.

(21) Appl. No.: 11/799,234

(22) Filed: Apr. 30, 2007

(65) Prior Publication Data

US 2008/0270936 A1   Oct. 30, 2008

(51) Int. Cl.
G06F 3/048 (2006.01)
G06F 3/14 (2006.01)

(52) U.S. Cl. .................. 715/788; 715/864; 715/784; 715/786; 715/787

(58) Field of Classification Search .......... 715/864, 715/788, 784, 786, 787
See application file for complete search history.

(56) References Cited

U.S. PATENT DOCUMENTS

| | | | | | |
|---|---|---|---|---|---|
| 4,751,507 | A | * | 6/1988 | Hama et al. | 715/784 |
| 4,823,303 | A | * | 4/1989 | Terasawa | 715/201 |
| 4,866,650 | A | * | 9/1989 | Oba et al. | 708/520 |
| 5,039,937 | A | * | 8/1991 | Mandt et al. | 324/121 R |
| 5,187,776 | A | * | 2/1993 | Yanker | 715/800 |
| 5,263,134 | A | * | 11/1993 | Paal et al. | 715/788 |
| 5,485,174 | A | * | 1/1996 | Henshaw et al. | 345/684 |
| 5,579,462 | A | * | 11/1996 | Barber et al. | 345/440 |
| 5,790,819 | A | * | 8/1998 | Rosenburg et al. | 715/856 |
| 5,959,628 | A | * | 9/1999 | Cecchini et al. | 715/808 |
| 6,054,990 | A | * | 4/2000 | Tran | 715/863 |
| 6,229,536 | B1 | * | 5/2001 | Alexander et al. | 345/440.1 |
| 6,359,620 | B1 | * | 3/2002 | Fujita | 345/440.1 |
| 6,559,868 | B2 | * | 5/2003 | Alexander et al. | 715/781 |
| 6,747,680 | B1 | | 6/2004 | Igarashi et al. | |
| 7,009,600 | B2 | * | 3/2006 | Jones et al. | 345/173 |
| 7,206,017 | B1 | * | 4/2007 | Suzuki | 348/36 |
| 7,379,811 | B2 | * | 5/2008 | Rasmussen et al. | 701/208 |
| 7,698,653 | B2 | * | 4/2010 | Roman et al. | 715/798 |
| 2008/0163116 | A1 | * | 7/2008 | Lee et al. | 715/815 |

FOREIGN PATENT DOCUMENTS

| | | |
|---|---|---|
| JP | 06028137 | 2/1994 |
| JP | 10283325 | 10/1998 |
| JP | 2003150562 | 5/2003 |
| JP | 2004206541 | 7/2004 |
| JP | 2005018238 | 1/2005 |

OTHER PUBLICATIONS

TI-89 TI92 PLus Guidebook for Advanced Mathematics Software Version 2.0, 2002, Texas Instruments.*
Hornbaek et al., Navigation Patterns and Usability of Zoomable User Interfaces with and without an Overview, Dec. 2002, ACM Transactions on Computer-Human Interaction, vol. 9, No. 4 pp. 362-389.*
PCT International Search Report dated Aug. 29, 2008.

* cited by examiner

*Primary Examiner*—Tadesse Hailu
*Assistant Examiner*—Nicholas S Ulrich

(57) ABSTRACT

A calculator comprises a display screen configured to display a graphical representation of at least a portion of a dataset and a module configured to display an interface on the display screen to enable a user to perform at least one adjustment function for the displayed graphical representation.

19 Claims, 7 Drawing Sheets

ELECTRONIC DEVICE DISPLAY ADJUSTMENT INTERFACE

BACKGROUND

Handheld electronic devices, such as calculators, comprise limited display screen sizes, which oftentimes results in difficulty reading graphical representations of datasets displayed on such screens. For example, in the event a large graphical dataset is displayed on a small display screen, the dataset must be scaled to fit thereon, sometimes making the graphical representation difficult or practically impossible to read.

BRIEF DESCRIPTION OF THE DRAWINGS

Brief Summary of the Invention

One example embodiment is calculator having a screen that displays a graphical representation of a dataset. The calculator includes an interface on the screen to enable a user to perform an adjustment function for the graphical representation being displayed.

DETAILED DESCRIPTION OF THE DRAWINGS

Various embodiments and the advantages thereof are best understood by referring to FIGS. 1-6 like numerals being used for like and corresponding parts of the various drawings.

Figure 1:
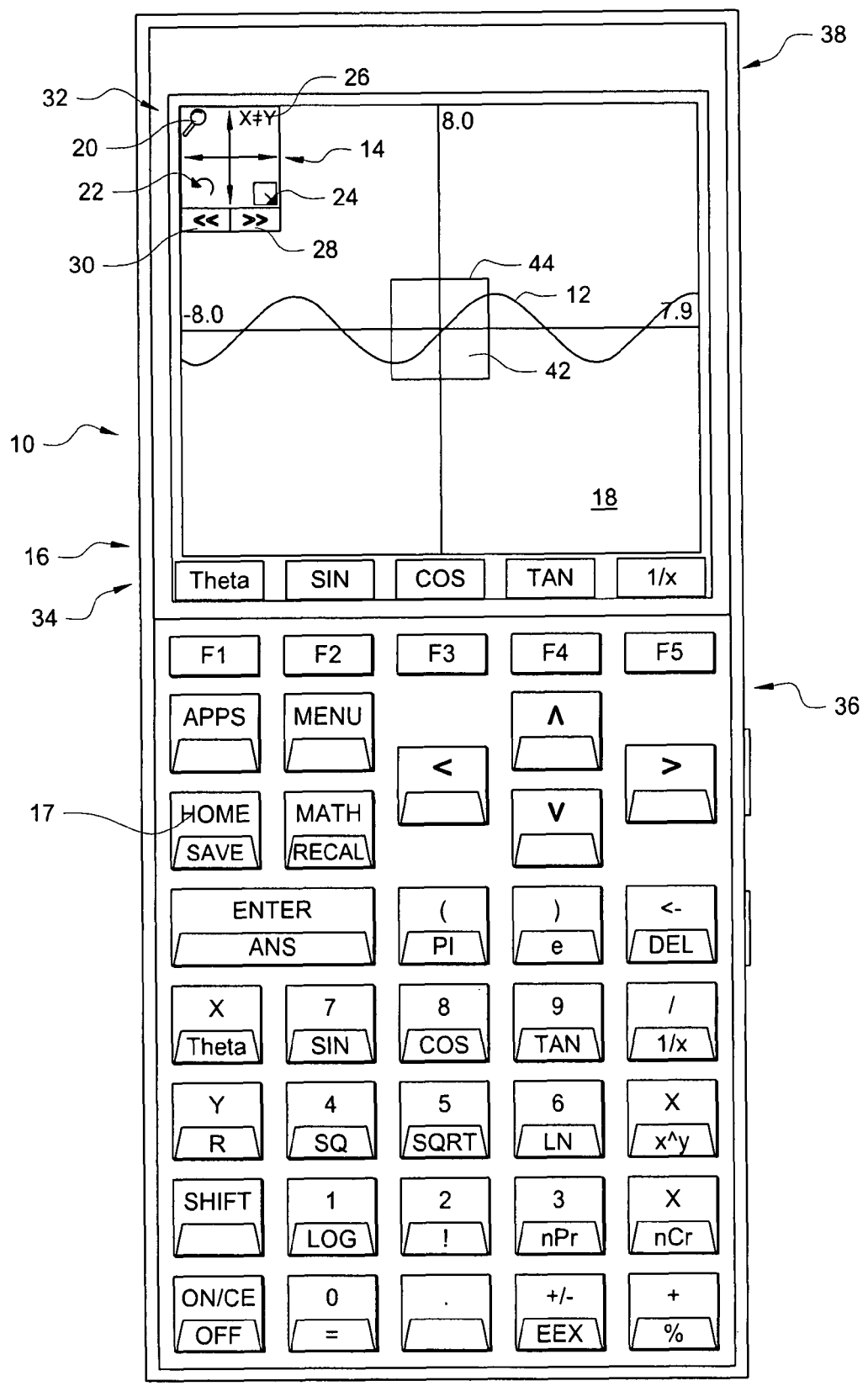
FIG. 1 is a diagram of an electronic device displaying a graphical representation of a dataset in which a display adjustment interface is employed to advantage.

FIG. 1 is a diagram of an electronic device 10 displaying a graphical representation of a dataset 12 in which a display adjustment interface 14 is employed to advantage. In the embodiment illustrated in FIG. 1, electronic device 10 comprises a calculator 16 comprising a keypad 17 and a display screen 18; however, it should be understood that electronic device 10 may comprise any type of electronic device, such as, but not limited to, a tablet personal computer, a personal digital assistant, a desktop computer, a cellular telephone, a gaming device, an entertainment device or any other type of portable or non-portable computing device. In the embodiment illustrated in FIG. 1, display adjustment interface 14 provides a user-interface on display screen 18 to enable a user to perform at least one display adjustment function for the displayed graphical representation of dataset 12. For example, display adjustment interface 14 enables a user to zoom in or zoom out on a specific portion of dataset 12. In addition, display adjustment interface 14 enables a user to scroll to specific portions/regions of dataset 12 to enable viewing of portions of dataset 12 not presently displayed on display screen 18. It should be understood that interface 14 may also be located and/or displayed at a location besides display screen 18.

In the embodiment illustrated in FIG. 1, display adjustment interface 14 comprises a toggle icon 20, an undo icon 22, a data select icon 24, an axis link icon 26, a scroll forward icon 28 and a scroll rearward icon 30 for enabling a user to adjust the displayed output of the graphical representation of dataset 12. However, it should be understood that one or more icons (e.g., icons 28 and 30) may be disposed on a single scroll bar or other type element instead of being separate elements. In the embodiment illustrated in FIG. 1, display adjustment interface 14 is disposed adjacent to corner 32 of display screen 18; however, it should be understood that display adjustment interface 14 may be otherwise disposed on display screen 18 (e.g., adjacent to corners 34, 36, and/or 38 and/or at any other position therebetween).

Figure 2:
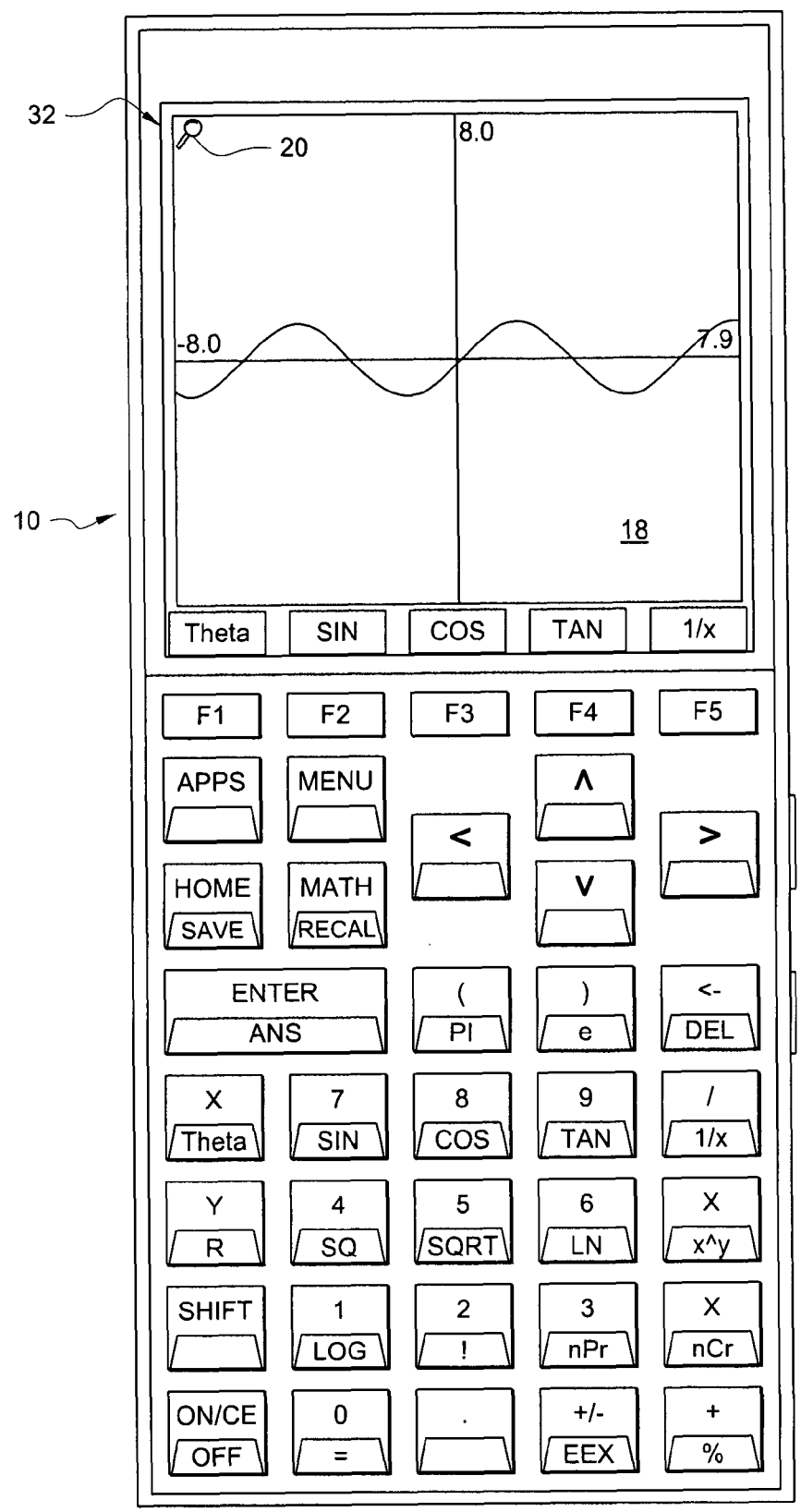
FIG. 2 is a diagram of the electronic device of FIG. 1 in which display adjustment interface is hidden.

FIG. 2 is a diagram of electronic device 10 of FIG. 1 in which display adjustment interface 14 is hidden (e.g., display adjustment interface 14 is removed from display screen 18). In the embodiment illustrated in FIG. 2, toggle icon 20 is actuatable to hide display adjustment interface 14 on display screen 18 in response touching and/or otherwise contacting toggle icon 20. For example, in order to remove display adjustment interface 14 from display screen 18 as illustrated in FIG. 2, a user touches and/or otherwise contacts toggle icon 20 to facilitate removal and/or hiding of display adjustment interface 14. In the embodiment illustrated in FIG. 2, toggle icon 20 remains illuminated when display adjustment interface 14 is hidden so as to enable a user to locate and depress toggle icon 20 in order to reveal display adjustment interface 14 on display screen 18. It should be understood that toggle icon 20 may be otherwise configured such that toggle icon 20 is also hidden such that when a user touches a designated portion of display screen 18 (e.g., in corner 32), display adjustment interface 14 (FIG. 1) is displayed on display screen 18. Further, it should be understood that other methods of displaying/hiding display adjustment interface 14 are available, such as for example, actuating a command key on keypad 17.

Figure 3:
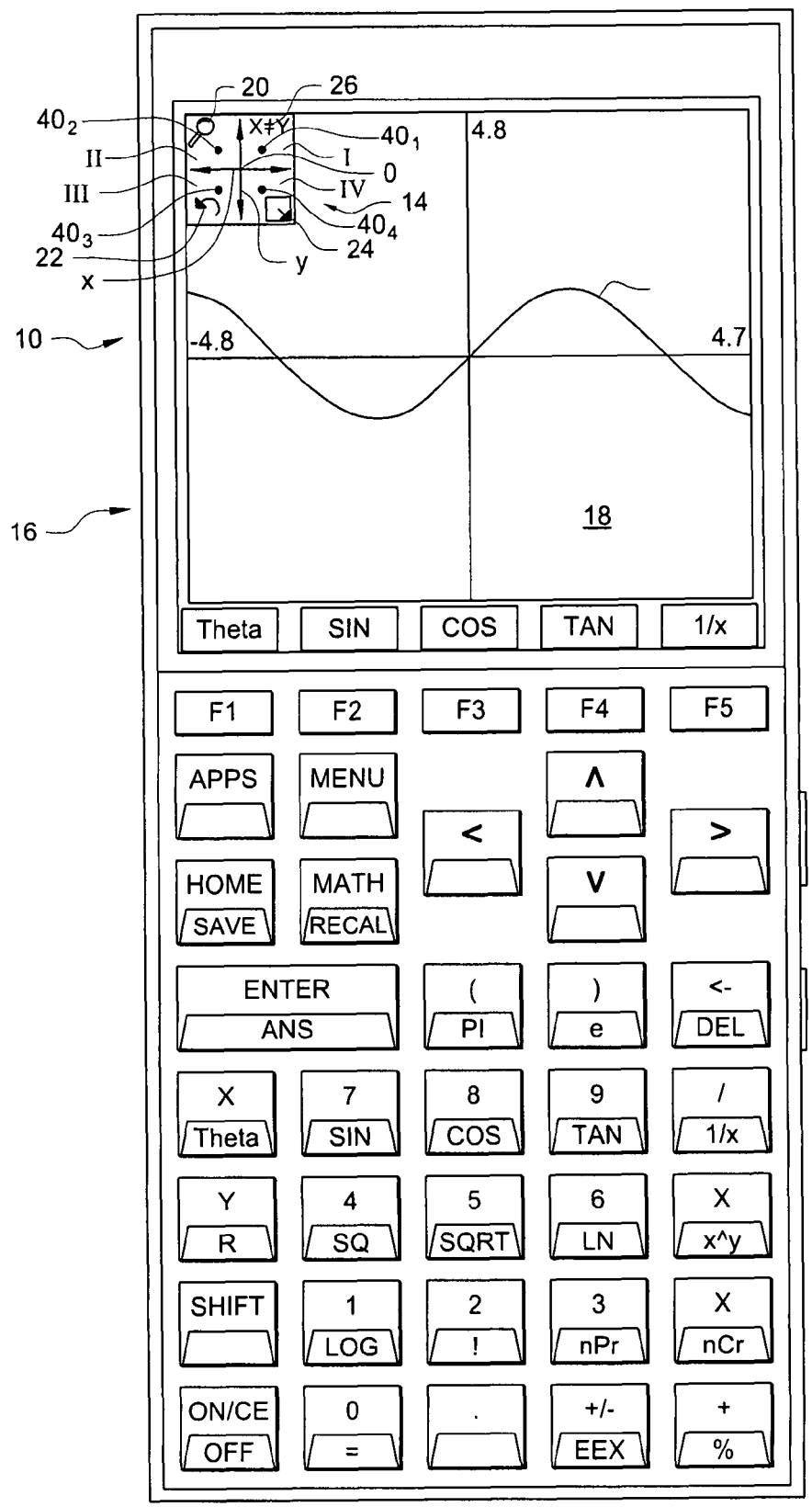
FIG. 3 is a diagram of the electronic device of FIG. 1 in which the display adjustment interface is configured to represent a zoomed-out view of at least a portion the graphical representation of the dataset.

FIG. 3 is a diagram of electronic device 10 of FIG. 1 in which display adjustment interface 14 is configured to represent a zoomed-out view of at least a portion the graphical representation of dataset 12. In the embodiment illustrated in FIG. 3, display adjustment interface 14 comprises quadrants I, II, III, and IV defined by horizontal axis x and perpendicular axis y. For purposes herein, axis x and axis y form a Cartesian coordinate system for representing the relative positions of points 40 from the origin O of display adjustment interface 14 (e.g., the intersection of axis x and axis y). In operation, when a user touches a location within a particular quadrant I, II, III or IV (e.g., user-selected points $40_1$, $40_2$, $40_3$ or $40_4$), calculator 16 will zoom in and/or zoom out on the graphical representation of dataset 12 corresponding to the distance of point 40 from origin O until the user ceases touching point 40 (e.g., zoom in/out in real time, such as every 1/10 of a second, until the user ceases touching point 40). For example, when a user touches point $40_1$ on display adjustment interface 14 at coordinates 0.1 and 0.05 (quadrant I), the graphical representation of dataset 12 enlarges (e.g., display screen 18 zooms-in on dataset 12) at a zoom rate of ten percent in the x direction and five percent in the y direction repeatedly at a predetermined interval until the user ceases touching point $40_1$. Likewise, when the user touches a point $40_2$ at coordinates −0.1 and 0.05 (quadrant II), the graphical representation of dataset 12 reduces (e.g., display screen 18 zooms out from dataset 12) at a zoom rate of ten percent in the x direction and enlarges at a zoom rate of five percent in the y direction un the user ceases touching point $40_2$. Similarly, when a user touches point $40_3$ on display adjustment interface 14 at coordinates −0.1 and −0.05 (quadrant III), the graphical representation of dataset 12 reduces at a zoom rate of ten percent in the x direction and five percent in the y direction repeatedly at a predetermined interval until the user ceases touching point $40_3$. Finally, when user touches point $40_4$ disposed on display adjustment interface 14 at coordinate 0.1 and −0.05 (quadrant IV), the graphical representation of dataset 12 enlarges at a zoom rate of ten percent in the x direction and decreases by five percent in the y direction repeatedly at a predetermined interval until the user ceases touching point $40_4$ In the embodiment illustrated in FIG. 3, axis link icon 26 is actuatable to enable a user to link axis x and axis y together such that zoom in and zoom out rates will be identical along axis x and axis y, regardless of the position of point 40 in a particular quadrant I, II, III or IV. In the embodiment illustrated in FIG. 3, when icon 26 is configured such that x=y, the zoom rates will be identical along axis x and axis y. For example, when a user touches point $40_1$ on display adjustment interface 14 at coordinates 0.1 and 0.05 (quadrant I), the graphical representation of dataset 12 enlarges (e.g., display screen 18 zooms-in on dataset 12) at a rate of ten percent over a predetermined time interval (e.g., ten percent each tenth of a second) in the x and y directions. Similarly, when a user touches point $40_3$ on display adjustment interface 14 at coordinates −0.1 and −0.05 (quadrant III), the graphical representation of dataset 12 reduces at a rate of ten percent over a predetermined time interval in both the x and y directions. When icon 26 is configured such that x≠y (FIG. 1) in response to touching and/or otherwise contacting icon 26, the zoom rates correspond to the positioning of the desired point 40, as previously discussed.

In the embodiment illustrated in FIG. 3, undo icon 22 is configured to undo one or more previous zoom-in or zoom-out commands (e.g., to return graphical representation of dataset 12 to the configuration prior to zooming in or zooming out). Thus, in response to touching undo icon 22, the immediately prior graphical representation(s) of dataset 12 is displayed on display screen 18.

Figure 4:
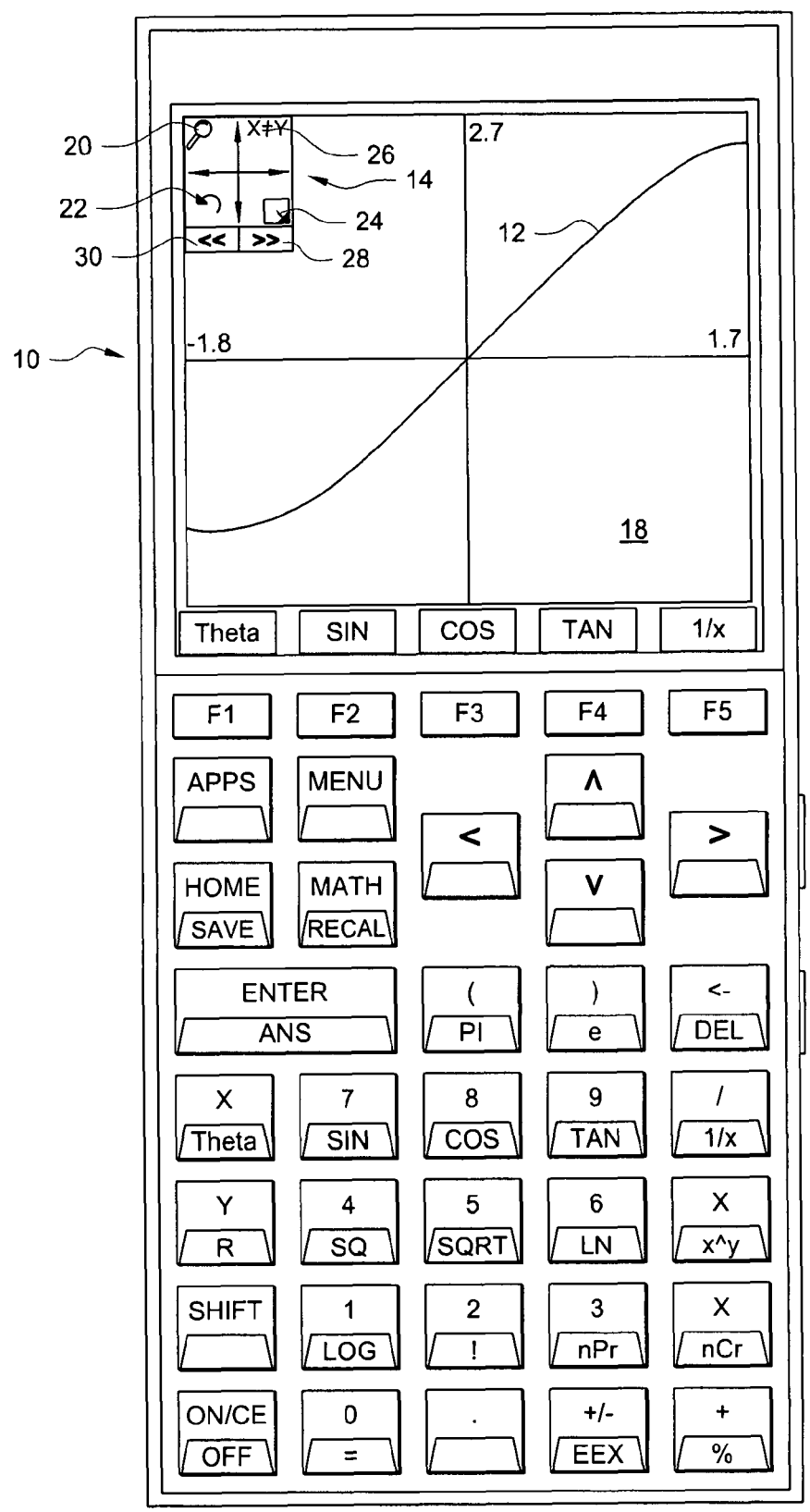
FIG. 4 is a diagram of the electronic device of FIG. 1 in which the display adjustment interface is configured to present a zoomed-in view of a portion of the dataset in FIG. 3.

FIG. 4 is a diagram of electronic device 10 of FIG. 1 in which the display adjustment interface 14 is configured to present a zoomed-in view of a selected portion of dataset 12 in FIG. 3. In the embodiment illustrated in FIGS. 3 and 4, data select icon 24 is configured to enable a user to select a particular area/region of dataset 12 on display screen 18 so as to display an enlarged view of the selected area/region on display screen 18. In operation, data select icon 24 is depressed to enable a user to select area/region 42 of dataset 12 (FIG. 3) by varying a size of a selection box 44 (FIG. 1) to encompass the desired area/region 42 of dataset 12 for display on display screen 18, as illustrated in FIG. 4. According to some embodiments, a user adjusts the size of selection box 42 by dragging one or more corners of selection box 44 directly on display screen 18 to surround and select the desired region of dataset 12.

Figure 5A:
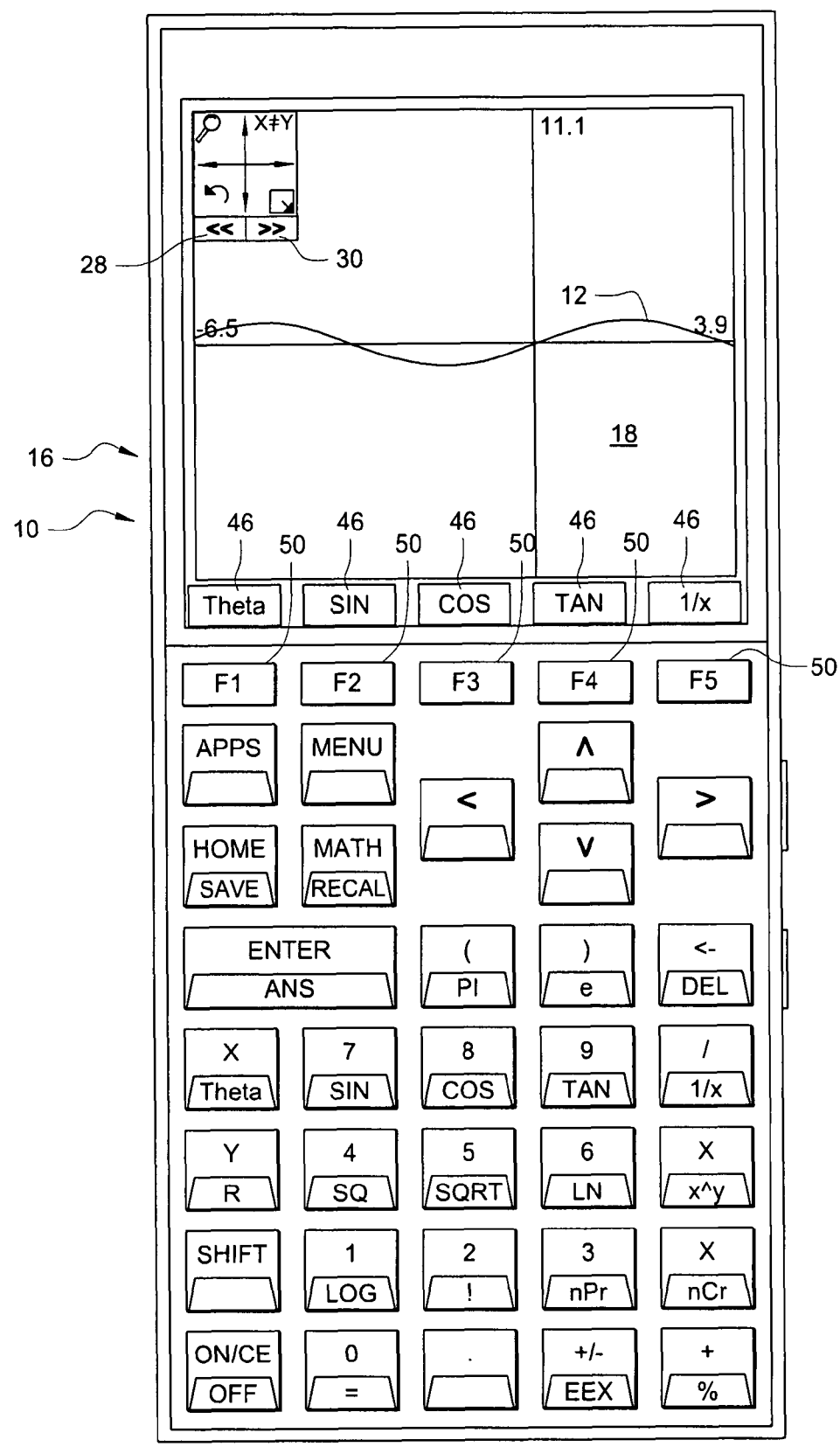
FIGS. 5a and 5b are diagrams illustrating the electronic device of FIG. 1 comprising a plurality of menu options and a scroll bar, respectively.
Figure 5B:
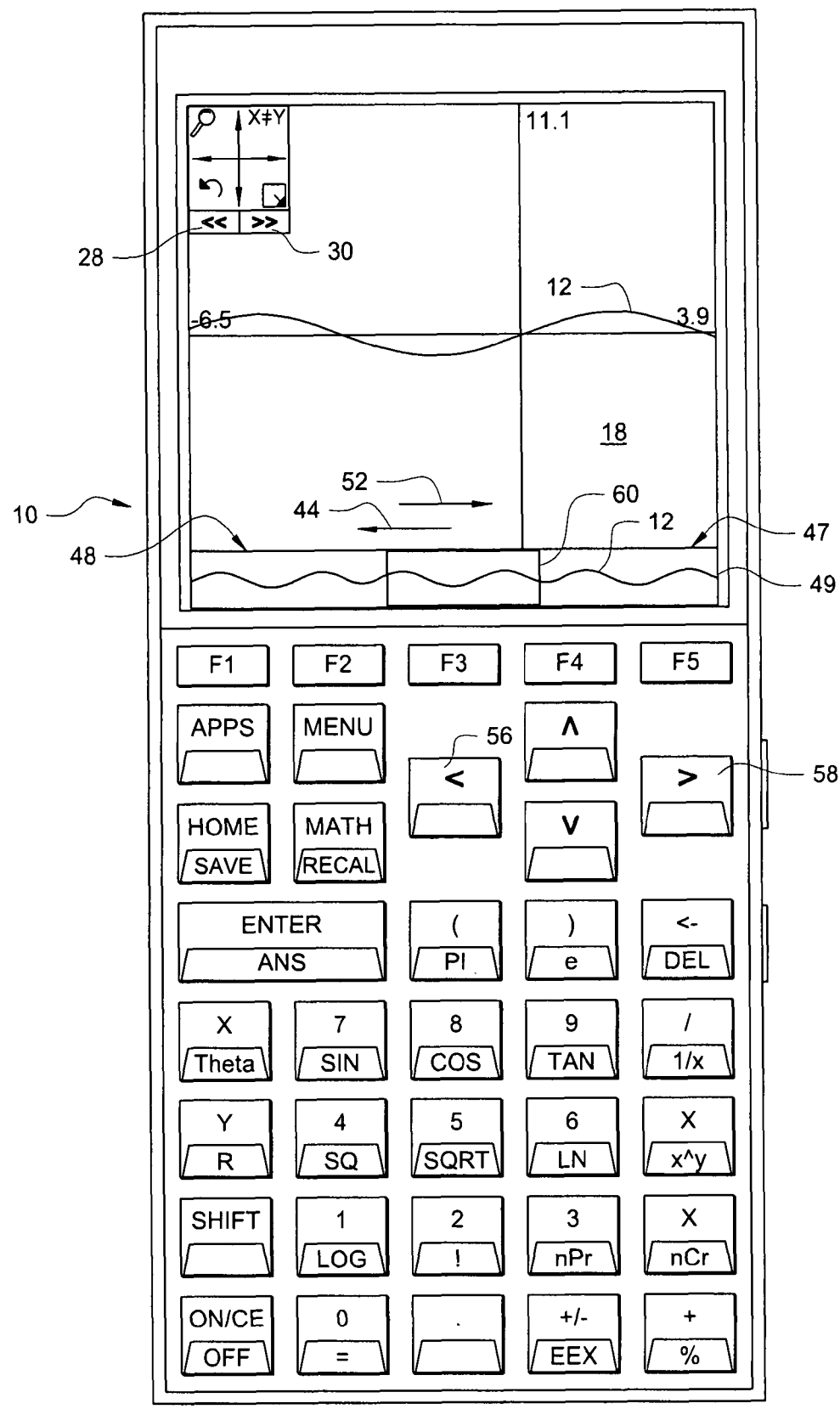

FIGS. 5a and 5b are diagrams illustrating electronic device 10 of FIG. 1 comprising a plurality of menu options 46 and a scroll bar 48, respectively. In the embodiment illustrated in FIG. 5a, menu options 46 are disposed above a plurality of corresponding menu keys 50 on keypad 17 to select input options and/or input commands corresponding to a particular menu option 46. In operation, menu options 46 are hidden and/or otherwise replaced with a window 47 (FIG. 5b) for displaying all (all or substantially all) of dataset 12 thereon in response to a user pressing either scroll forward icon 28 or scroll rearward icon 30. In operation, icons 28 and 30 enable a user to pan forward (e.g., in the direction of arrow 52 in FIG. 5b) or rearward (e.g., in the direction of arrow 44 in FIG. 5b), respectively, along dataset 12 to facilitate viewing of specific portions of dataset 12 on display 18. In response to releasing scroll forward icon 28 or scroll rearward icon 30, window 47 is reconfigured such that dataset 12 is replaced with menu options 46. It should be understood that display of dataset 12 may be in response to other inputs, such as for example, scrolling buttons 56 and 58 disposed on keypad 17.

In the embodiment illustrated in FIG. 5b, window 47 comprises a positioning indicator 60 to illustrate the current portion of dataset 12 illustrated on display screen 18 with respect to the entire dataset 12 displayed in window 47. Thus, a user can view the entire graphical representation of dataset 12 in window 47 and indicate the exact location of the dataset 12 the user desires to be displayed on display screen 18 relative to the entire graphical representation of dataset 12 via positioning indicator 60.

Figure 6:
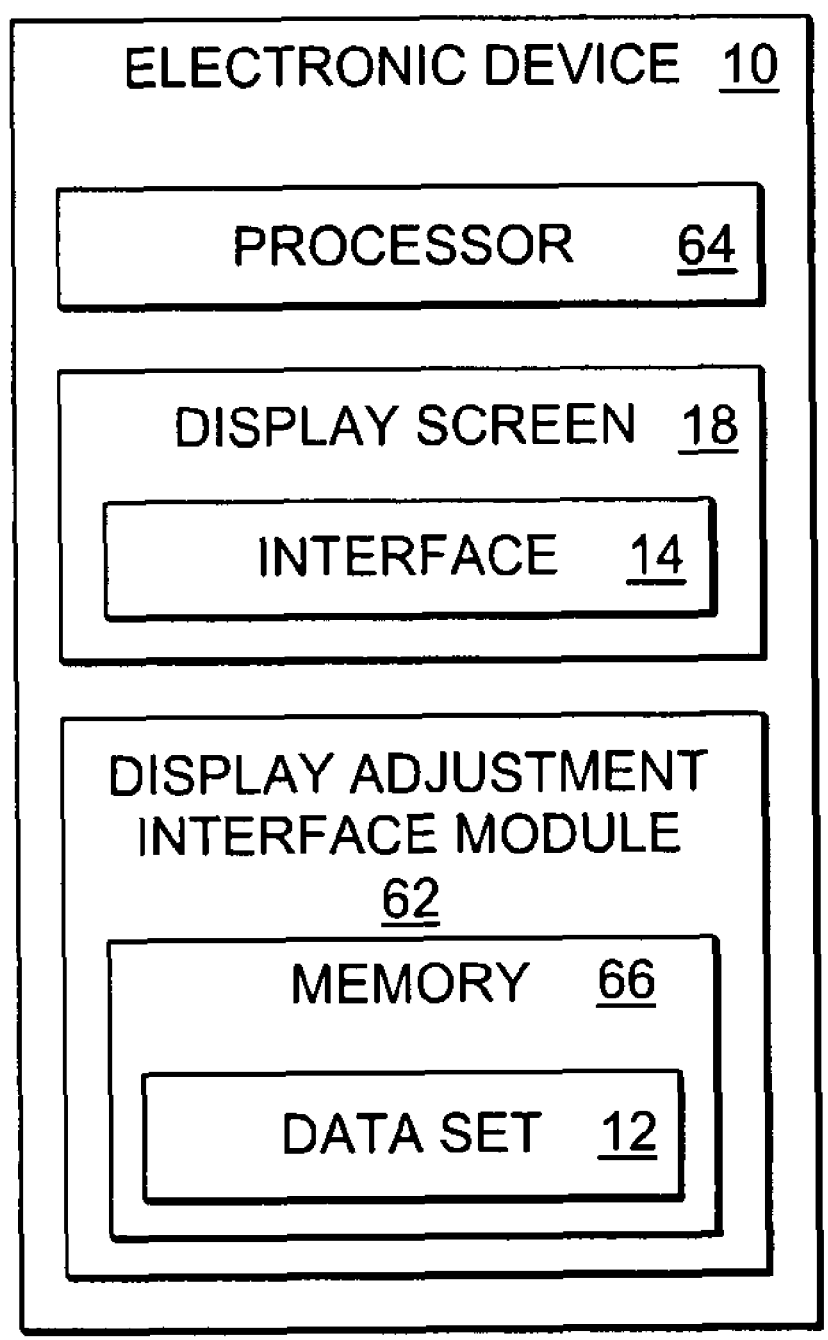
FIG. 6 is a block diagram of the calculator of FIGS. 1-5b illustrating a display module.

FIG. 6 is a block diagram electronic device 10 of FIGS. 1-5b illustrating a display adjustment interface module 62. In the embodiment illustrated in FIG. 6, electronic device 10 comprises a processor 64, display screen 18 comprising display adjustment interface 14 and display adjustment interface module 62. Display adjustment interface module 62 comprises a memory 66 for storing dataset 12. In operation, in response to receiving an input from interface 14 (e.g., actuation of icon 22, 24, 26, 28, and/or 30), display adjustment interface module 62 adjusts the output of the graphical representation of dataset 12 on display screen 18 based on the various received input commands via display adjustment interface 14.

Thus, embodiments of a display adjustment interface 14 are manufactured to provide a user-interface on a display screen 18 to enable a user to perform at least one display adjustment function for the displayed graphical representation of dataset 12. For example, display adjustment interface 14 enables a user to configure display screen 18 to zoom in or zoom out on a portion of dataset 12. In addition, display adjustment interface 14 also enables a user to scroll to desired portions/regions of dataset 12 (e.g., portions not currently displayed on display screen 18) to enable viewing thereof. Further, embodiments of electronic device 10 comprise a window 47 to facilitate viewing of all or substantially all of dataset 12 relative to the portion of dataset 12 illustrated on display screen 18. It should be understood that particular features may be especially advantageous for datasets 12 of an infinite length while other aspects are particularly advantageous for finite datasets.

Thus, embodiments of an electronic device, such as a calculator, may be manufactured by providing a display screen configured to display a graphical representation of at least a portion of a dataset and by providing an interface on the display screen to enable a user to perform at least one adjustment function for the displayed graphical representation. The device may also be manufactured by providing a zoom command on the interface, by providing an undo command on the interface, by providing a toggle command configured to toggle the interface between a displayed state and a hidden state, by providing a data select command on the interface to facilitate selecting a portion of the graphical representation of the dataset for viewing on the display screen, and/or by providing a window disposed within the display screen to display a graphical representation of all of the dataset. The device may also be manufactured by providing a window disposed within the display screen in response to receiving a scroll command, and by providing a positioning indicator in the window to indicate the portion of the dataset of substantially all of the dataset represented in the display screen relative to all of the dataset.

What is claimed is:

1. A calculator, comprising:
a display screen that displays a graphical representation of at least a portion of a dataset; and
an interface on the display screen at a separate location from the graphical representation displayed on the display screen to enable a user to perform at least one adjustment function for the displayed graphical representation, wherein activation on the interface at a first point located a distance from a point of origin on the interface zooms in or zooms out on the graphical representation at a second point that corresponds to the distance from the point of origin, wherein the interface comprises four quadrants defined by an axis x and an axis y that form a Cartesian coordinate system with positions from the point of origin on the coordinate system representing similar relative positions from a second point of origin of the graphical representation.

2. The calculator of claim 1, wherein zooming in or zooming out on the graphical representation continues until a user ceases to touch the first point on the interface.

3. The calculator of claim 1, wherein the interface comprises a toggle command configured to toggle the interface between a displayed state and a hidden state.

4. The calculator of claim 1, wherein the interface comprises an axis link icon to provide an zoom rate in a first direction equal to a zoom rate in a second direction.

5. The calculator of claim 1, wherein the interface comprises a data select command to facilitate selecting a portion of the graphical representation of the dataset for viewing on the display screen.

6. The calculator of claim 1, further comprising a window disposed within the display screen to display a second graphical representation of all of the dataset.

7. The calculator of claim 6, wherein the window appears on the display screen in response to depressing a scroll command.

8. The calculator of claim 6, further comprising a positioning indicator to indicate the portion of the dataset represented in the display screen relative to all of the dataset.

9. A method of manufacturing a calculator, comprising:
providing a display screen that displays a graphical representation of at least a portion of a dataset; and
providing an interface displayed with the graphical representation on the display screen to enable a user to perform at least one adjustment function for the displayed graphical representation, wherein the interface is separate from the graphical representation and activation on the interface at a first point located a distance from a point of origin on the interface zooms in or zooms out on the graphical representation at a second point that corresponds to the distance from the point of origin, wherein the interface comprises four quadrants defined by an axis x and an axis y that form a coordinate system with positions from the point of origin on the coordinate system representing similar relative positions from a second point of origin of the graphical representation.

10. The method of claim 9, wherein zooming in or zooming out on the graphical representation continues until a user ceases to touch the first point on the interface.

11. The method of claim 9, further comprising providing a toggle command configured to toggle the interface between a displayed state and a hidden state.

12. The method of claim 9, further comprising providing a data select command on the interface to facilitate selecting a portion of the graphical representation of the dataset for viewing on the display screen.

13. The method of claim 9, further comprising providing a window disposed within the display screen to display a second graphical representation of all of the dataset.

14. The method of claim 9, further comprising providing a window disposed within the display screen in response to receiving a scroll command.

15. The method of claim 13, further comprising providing a positioning indicator in the window to indicate the portion of the dataset of substantially all of the dataset represented in the display screen relative to all of the dataset.

16. A calculator, comprising:
a means for displaying a graphical representation of at least a portion of a dataset; and
a means for interfacing on the means for displaying at a separate location from the graphical representation displayed on the means for displaying to enable a user to perform at least one adjustment function for the displayed graphical representation, wherein activation on the means for interfacing at a first point located a distance from a point of origin on the means for interfacing zooms in or zooms out on the graphical representation at a second point that corresponds to the distance from the point of origin, and the means for interfacing comprises four quadrants defined by an axis x and an axis y that form a Cartesian coordinate system with positions from the point of origin on the coordinate system representing similar relative positions from a second point of origin of the graphical representation.

17. The calculator of claim 16, wherein zooming in or zooming out on the graphical representation continues until a user ceases to touch the first point on the interface means.

18. An electronic device, comprising:
a display that simultaneously displays an interface and a graphical representation of a data set, wherein the interface displays a coordinate system such that activation on the interface at a first point on the coordinate system causes a zoom operation on the graphical representation, the zoom operation occurs at a location on the graphical representation that corresponds to a location of the first point on the coordinate system, wherein the interface comprises four quadrants defined by an axis x and an axis y that form a Cartesian coordinate system with positions from the point of origin on the coordinate system representing similar relative positions from a second point of origin of the graphical representation.

19. The electronic device of claim 18, wherein the electronic device comprises a calculator, and the zoom operation continues until the activation on the interface at the first point ceases.

* * * * *